United States Patent
Parekh

(10) Patent No.: US 11,093,938 B2
(45) Date of Patent: Aug. 17, 2021

(54) COMPUTER SYSTEMS AND COMPUTER-IMPLEMENTED METHODS FOR CARD-NOT-PRESENT TRANSACTIONS

(71) Applicant: MASTERCARD INTERNATIONAL INCORPORATED, Purchase, NY (US)

(72) Inventor: Pravin Parekh, Pune (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 261 days.

(21) Appl. No.: 16/022,281

(22) Filed: Jun. 28, 2018

(65) Prior Publication Data

US 2019/0026735 A1 Jan. 24, 2019

(30) Foreign Application Priority Data

Jul. 24, 2017 (SG) .............................. 10201706013S

(51) Int. Cl.
*G06Q 20/10* (2012.01)
*G06Q 20/20* (2012.01)
(Continued)

(52) U.S. Cl.
CPC ......... *G06Q 20/388* (2013.01); *G06Q 20/405* (2013.01); *G06Q 20/4012* (2013.01); *G06Q 20/40145* (2013.01)

(58) Field of Classification Search
CPC ..... G06Q 20/388; G06Q 20/405; G06Q 20/10
(Continued)

(56) References Cited

U.S. PATENT DOCUMENTS

| | | | |
|---|---|---|---|
| 6,163,771 A * | 12/2000 | Walker | G06Q 20/04 705/18 |
| 2007/0174164 A1 * | 7/2007 | Biffle | G06Q 20/02 705/35 |

(Continued)

OTHER PUBLICATIONS

"Evaluating The Performance Of Two-Factor Authentication Solution In the Banking Sector", Olufemi Sunday Adeoye, University of Uyo, Nigeria, IJCSI International Journal of Computer Science Issues, vol. 9, Issue 4, No. 2, Jul. 2012 [Retrieved from Google Scholar], (Year: 2012).*

(Continued)

*Primary Examiner* — Hai Tran
(74) *Attorney, Agent, or Firm* — Harness, Dickey & Pierce, P.L.C.

(57) ABSTRACT

A server for processing a card-not-present transaction is described. The server comprises at least a computer processor and a data storage device, the data storage device comprising instructions operative by the processor to: (i) receive a transaction authorization request, where the transaction authorization request comprises an indication of a payment card number and a delivery address used in the card-not-present transaction; (ii) retrieve, from a database, a registered address associated with the indication of the payment card number, the database being operatively connected to the server; (iii) compare the delivery address with the registered address; and (iv) generate a transaction authorization response based on a result of the comparison, where the transaction authorization response comprises an indication that the card-not-present transaction is to proceed if the delivery address matches the registered address.

14 Claims, 5 Drawing Sheets

(51) Int. Cl.
*G06Q 20/24* (2012.01)
*G06Q 20/38* (2012.01)
*G06Q 20/40* (2012.01)

(58) Field of Classification Search
USPC .......................................................... 705/44
See application file for complete search history.

(56) References Cited

U.S. PATENT DOCUMENTS

| | | | |
|---|---|---|---|
| 2008/0046368 A1* | 2/2008 | Tidwell | G06Q 20/042 705/44 |
| 2009/0063345 A1* | 3/2009 | Erikson | G06Q 20/102 705/44 |
| 2011/0040640 A1* | 2/2011 | Erikson | G06Q 40/00 705/18 |
| 2012/0066080 A1* | 3/2012 | Erikson | G06Q 30/06 705/16 |
| 2012/0221472 A1* | 8/2012 | Erikson | G06Q 20/4037 705/44 |
| 2014/0279522 A1* | 9/2014 | Musser | G06Q 20/401 705/44 |

OTHER PUBLICATIONS

"Assessing and Improving authentication confidence management", Michael Pearce, Information Management & Computer Security 18.2: 124-139. Emerald Group Publishing Limited (2010) [Retrieved from Dialog], (Year: 2010).*

* cited by examiner

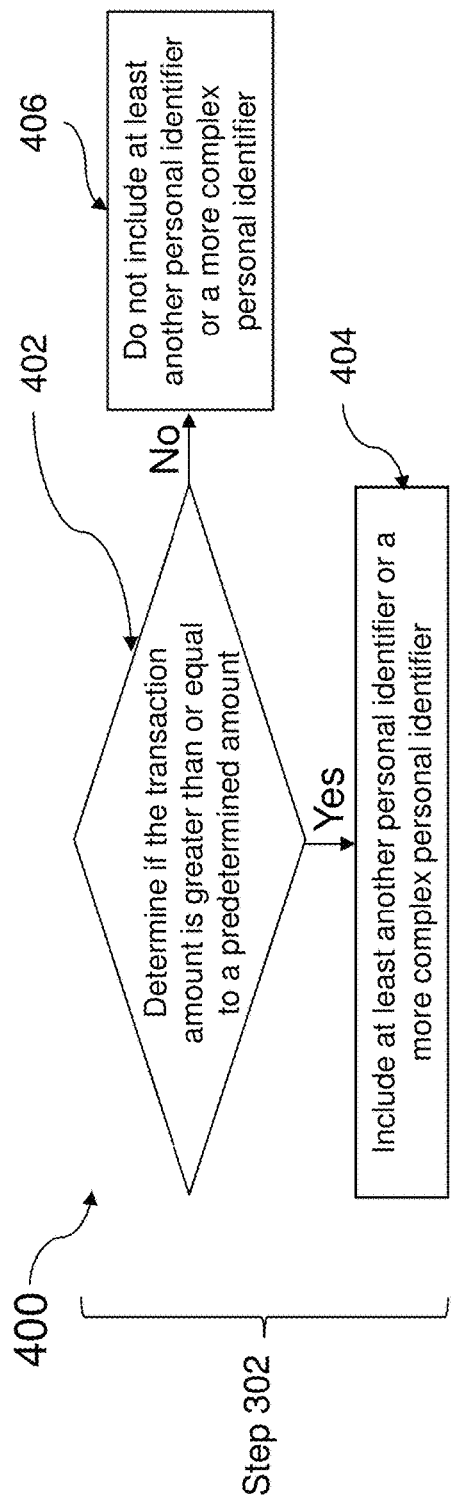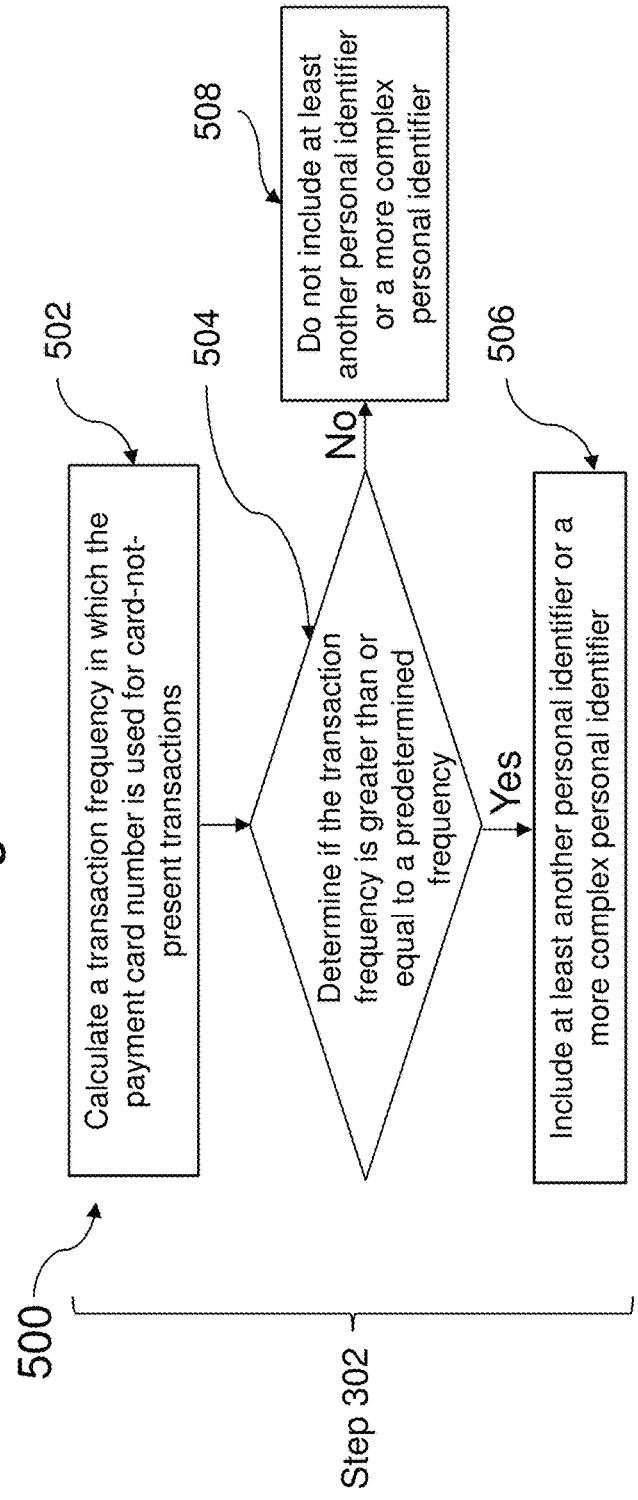

COMPUTER SYSTEMS AND COMPUTER-IMPLEMENTED METHODS FOR CARD-NOT-PRESENT TRANSACTIONS

CROSS-REFERENCE TO RELATED APPLICATION

This application claims the benefit of and priority to Singapore Patent Application No. 10201706013S filed Jul. 24, 2017. The entire disclosure of the above application is incorporated herein by reference.

FIELD

The present disclosure generally relates to computer systems and computer-implemented methods for card-not-present transactions, in particular, for facilitating card-not-present transactions with authentication to prevent frauds.

BACKGROUND

This section provides background information related to the present disclosure which is not necessarily prior art.

Widespread use of the internet in the twenty-first century has altered the way business is carried out. In order to provide convenience to consumers so as to attract them to their goods and services, merchants are moving their shopfronts to a virtual space by setting up online electronic commerce (e-commerce) platforms. As a result, consumers no longer have to be present at a physical shop-front to purchase their desired goods and services but can now enjoy the convenience of shopping at any time and at any location.

Consequently, card-not-present transactions, where consumers simply input their payment card details online to purchase their desired goods and services, have become ubiquitous. Coupled with an extensive use of payment card details for card-not-present transactions is a risk that these details may be compromised. The compromised payment card details may then be used for subsequent fraudulent card-not-present transactions without the knowledge and the authorization of the consumers.

At present, the most common form of validation for card-not-present transactions is authentication using a card verification code (CVC2 or CVV2) associated with a payment card. A CVC2 is typically printed on a payment card and it can be used to verify the physical presence of the payment card for card-not-present transactions. Nonetheless, if the payment card is stolen, the CVC2 associated with the payment card is also available to the thief. As such, the CVC2 may not be an adequate security measure for card-not-present transactions.

It is therefore an aim of the present disclosure to provide computer systems and computer-implemented methods to improve security and to prevent, or lessen the risk of, frauds for card-not-present transactions.

SUMMARY

This section provides a general summary of the disclosure, and is not a comprehensive disclosure of its full scope or all of its features. Aspects and embodiments of the disclosure are set out in the accompanying claims.

In general terms, the present disclosure proposes computer systems and computer-implemented methods for processing a card-not-present transaction. As an additional authentication step, a delivery address comprised in an order indication made by a consumer at a merchant server for a card-not-present transaction is compared with a registered address associated with an indication of a payment card number used for the card-not-present transaction. A transaction authorization response comprising an indication that the card-not-present transaction is to proceed is generated if the delivery address matches the registered address.

There is provided a network for processing a card-not-present transaction. The network comprises: a transaction processing server, the transaction processing server comprising a computer processor and a data storage device, the data storage device comprising non-transitory instructions operative by the processor to: receive a transaction request comprising an indication of a payment card number, a transaction amount and a delivery address associated with the card-not-present transaction; generate a transaction authorization request, the transaction authorization request comprising the indication of the payment card number and the delivery address; and transmit the transaction authorization request to an issuer server via a payment network server; and the issuer server comprising at least a computer processor and a data storage device, the data storage device comprising non-transitory instructions operative by the processor to: receive the transaction authorization request; retrieve, from a database, a registered address associated with the indication of the payment card number; compare the delivery address with the registered address; and generate a transaction authorization response based on a result of the comparison, the transaction authorization response comprising an indication that the card-not-present transaction is to proceed if the delivery address matches the registered address.

In a first aspect of the present disclosure, there is provided a server for processing a card-not-present transaction. The server comprises at least a computer processor and a data storage device, the data storage device comprises instructions operative by the processor to: receive a transaction authorization request, the transaction authorization request comprising an indication of a payment card number and a delivery address used in the card-not-present transaction; retrieve, from a database, a registered address associated with the indication of the payment card number, the database being operatively connected to the server; compare the delivery address with the registered address; and generate a transaction authorization response based on a result of the comparison, the transaction authorization response comprising an indication that the card-not-present transaction is to proceed if the delivery address matches the registered address.

In an embodiment, the processor of the server is further configured to: generate a verification request if the delivery address does not match the registered address, wherein the verification request comprises a request for at least one personal identifier, the at least one personal identifier being associated with the indication of the payment card number; send the verification request; receive a verification response comprising at least one personal identifier input; compare the at least one personal identifier input with the at least one personal identifier; and generate a second-factor transaction authorization response based on a result of the comparison, the second-factor transaction authorization response comprising an indication that the card-not-present transaction is to proceed if the at least one personal identifier input matches the at least one personal identifier.

In an embodiment, the transaction authorization request further comprises a transaction amount associated with the card-not-present transaction, the processor of the server is further configured to: determine if the transaction amount is greater than or equal to a transaction threshold, the transaction threshold being associated with the indication of the payment card number; and include at least another personal identifier or a more complex personal identifier in the verification request if it is determined that the transaction amount is greater than or equal to the transaction threshold.

In an embodiment, the processor of the server is further configured to: calculate a transaction frequency with which the indication of the payment card number is used for card-not-present transactions; determine if the transaction frequency is greater than or equal to a transaction frequency threshold, the transaction frequency threshold being associated with the indication of the payment card number; and include at least another personal identifier or a more complex personal identifier in the verification request if it is determined that the transaction frequency is greater than or equal to the transaction frequency threshold.

In an embodiment, the server is either a payment network server associated with a payment network or an issuer server associated with an issuer institution.

In an embodiment, the at least one personal identifier is one of the following: a personal identification number (PIN), a one-time password (OTP), a gesture, a name of a childhood friend, a wedding anniversary date or a biometric identifier.

In a second aspect of the present disclosure, there is described a computer-implemented method for processing a card-not-present transaction. The method comprises: receiving, at a server, a transaction authorization request, the transaction authorization request comprising an indication of a payment card number and a delivery address; retrieving, at the server, a registered address associated with the indication of the payment card number; comparing, at the server, the delivery address with the registered address; and generating, by the server, a transaction authorization response based on a result of the comparison, the transaction authorization response comprising an indication that the card-not-present transaction is to proceed if the delivery address matches the registered address.

In an embodiment, the method further comprises: generating, by the server, a verification request if the delivery address does not match the registered address, wherein the verification request comprises a request for at least one personal identifier, the at least one personal identifier being associated with the indication of the payment card number; sending, by the server, the verification request; receiving, at the server, a verification response comprising at least one personal identifier input; comparing, at the server, the at least one personal identifier input with the at least one personal identifier; and generating, by the server, a second-factor transaction authorization response based on the comparison, the second-factor transaction authorization response comprising an indication that the card-not-present transaction is to proceed if the at least one personal identifier input matches the at least one personal identifier.

In an embodiment, the transaction authorization request further comprises a transaction amount associated with the card-not-present transaction, the step of generating a verification request further comprises: determining, by the server, if the transaction amount is greater than or equal to a transaction threshold, the transaction threshold being associated with the indication of the payment card number; and including, by the server, at least another personal identifier or selecting a more complex personal identifier in the verification request if it is determined that the transaction amount is greater than or equal to the transaction threshold.

In an embodiment, the step of generating a verification request further comprises: calculating, by the server, a transaction frequency with which the indication of the payment card number is used for card-not-present transactions; determining, by the server, if the transaction frequency is greater than or equal to a transaction frequency threshold, the transaction frequency threshold being associated with the indication of the payment card number; and including, by the server, at least another personal identifier or a more complex personal identifier in the verification request if it is determined that the transaction frequency is greater than or equal to the transaction frequency threshold.

In an embodiment, the step of retrieving the registered address associated with the indication of the payment card number further comprises querying a database to ascertain the registered address associated with the indication of the payment card number, the database being operationally connected to the server.

In an embodiment, the database is associated with the issuer server or the payment network server.

In a third aspect of the present disclosure, there is provided a non-transitory computer-readable medium having stored thereon program instructions for causing at least one processor to perform the preceding method.

In this way, the computer systems and computer-implemented methods provide improved security for card-not-present transactions by comparing a delivery address comprised in an order indication made by a consumer at a merchant server for a card-not-present transaction to a registered address associated with an indication of a payment card number used for the card-not-present transaction. Moreover, the present disclosure builds on existing infrastructures for current card-not-present transactions, requiring only additional steps of extracting the delivery address associated with the card-not-present transactions from the order indication and comparing it with the registered address associated with the indication of the payment card number used in the card-not-present transaction, thereby providing additional security measures compared to current card-not-present transactions, through easy implementations and with minimized set-up costs.

Other desirable features and characteristics will become apparent from the subsequent detailed description and the appended claims, taken in conjunction with the accompanying drawings of the disclosure.

DRAWINGS

The drawings described herein are for illustrative purposes only of selected embodiments and not all possible implementations, and are not intended to limit the scope of the present disclosure. Non-limiting embodiments of the disclosure will now be described for the sake of example only, with reference to the following drawings in which:

FIG. 4 shows additional steps to the method of FIG. 3 which may be performed by the server in accordance with an embodiment of the disclosure;

FIG. 5 shows additional steps to the method of FIG. 3 which may be performed by the server in accordance with an embodiment of the disclosure.

Corresponding reference numerals indicate corresponding parts throughout the several views of the drawings.

DETAILED DESCRIPTION

Embodiments of the present disclosure will be described, by way of example only, with reference to the drawings. The description and specific examples included herein are intended for purposes of illustration only and are not intended to limit the scope of the present disclosure.

As used herein, the term "payment card" refers to any cashless payment device associated with a payment account, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, transponder devices, NFC-enabled devices, and/or computers. In addition, the "payment card" may exist as application-based stored value accounts associated with an electronic wallet service provider tied in with an issuer institution.

The terms "component," "module," "system," "apparatus," "interface," or the like, are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Moreover, the claimed subject matter may be implemented as a method, apparatus, or article of manufacture using standard programming and/or engineering techniques to produce software, firmware, hardware, or any combination thereof, to control a computer to implement the disclosed subject matter. For instance, the claimed subject matter may be implemented as a computer-readable medium embedded with a computer executable program, which encompasses a computer program accessible from any computer-readable storage device or storage media. For example, computer readable media can include, but is not limited to, magnetic storage devices (e.g., hard disk, floppy disk, magnetic strips, etc.), optical disks (e.g., compact disk (CD), digital versatile disk (DVD), etc.), smart cards, and flash memory devices (e.g., card, stick, key drive, etc.).

Figure 1:
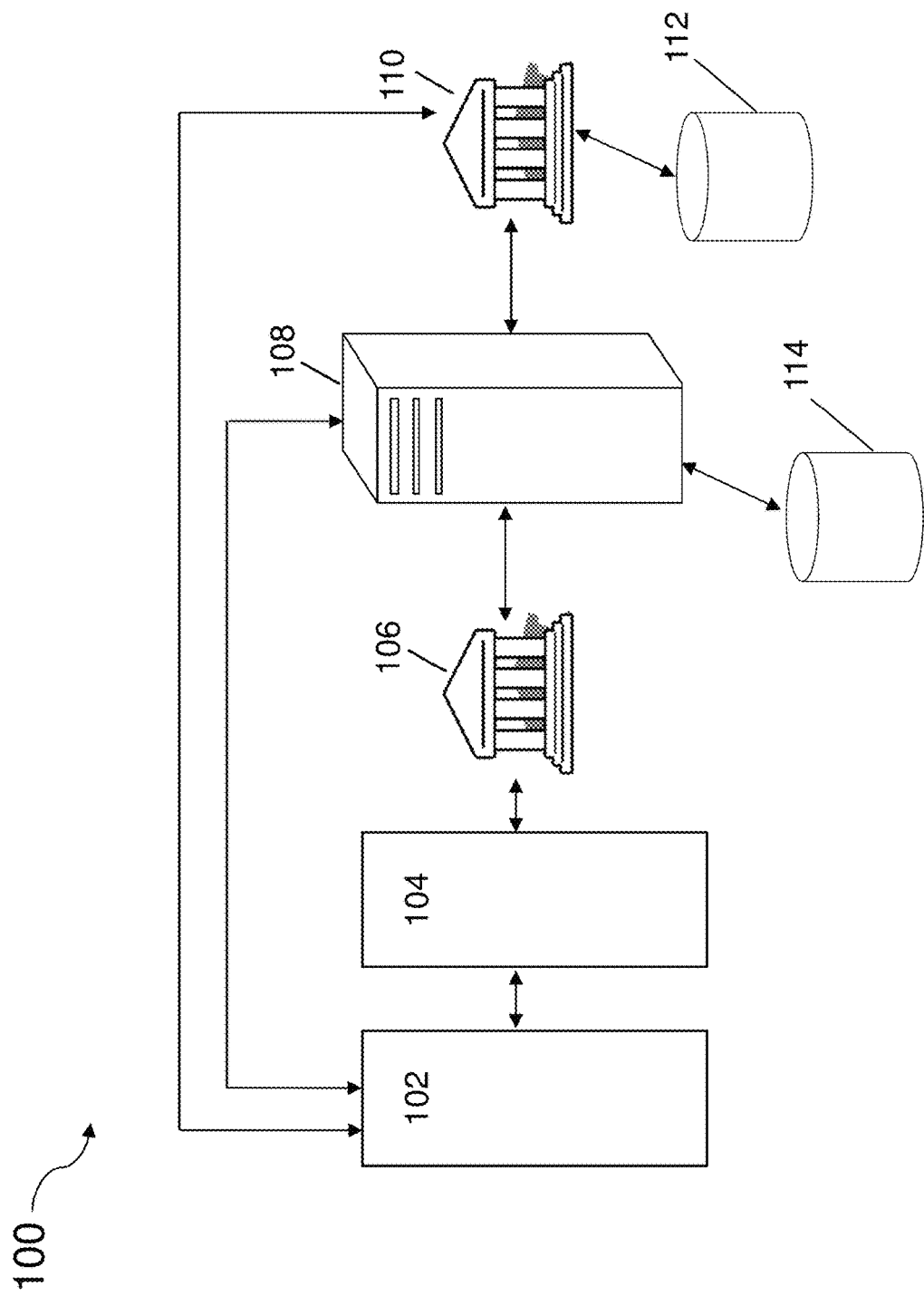
FIG. 1 shows a computerized network which is a first embodiment of the disclosure.

Referring to FIG. 1, an example of a computerized network 100 is shown. The computerized network 100 comprises a payment network server 108 which facilitates a card-not-present transaction between a consumer (e.g., a payment card holder) and a merchant which receives the funds. The payment network server 108 is a server associated with a payment network, such as the Banknet payment network operated by Mastercard®. As shown in FIG. 1, the payment network server 108 is coupled to an acquirer server 106 and an issuer server 110. The issuer server 110 is a server associated with an issuer institution. The issuer institution is authorized by the payment network to issue payment cards on behalf of customers to perform transactions over the payment network. The issuer institution also provides funding of the transaction to the payment network for transactions that are approved. The acquirer server 106 is operated by an acquirer institution at which the merchant maintains an account to receive funds. The acquirer server 106 may also be associated with a payment gateway as part of a merchant service which is provided by an e-commerce application service provider that authorizes credit card or direct payments processing for e-businesses, online retailers, etc. Although only one acquirer server 106 and only one issuer server 110 are shown in FIG. 1, a plurality of acquirer servers 106 operated by respective acquirer institutions and/or a plurality of issuer servers 110 operated by respective issuer institutions may also form part of the computerized network 100. Similarly, a plurality of consumer devices 102 and/or a plurality of merchant servers 104 may also form part of the computerized network 100, although only one consumer device 102 and only one merchant server 104 are shown in FIG. 1. Note that the term "institution" is used here in a sense which is not necessarily limited to organizations which are legally constituted as banks, since in some jurisdictions other organizations may be permitted to issue payment cards associated with financial accounts. In an embodiment, the issuing or acquirer institution can be one of the following: a bank, a financial technology company, or a financial institution. Moreover, an issuer database 112 and a payment network database 114 are operationally connected to the issuer server 110 and the payment network server 108, respectively. The issuer database 112 serves at least to store information associated with a payment card issued by the issuer institution operating the issuer server 110. In an embodiment, the issuer database 112 also stores data in regards to card-not-present transactions carried out by the payment card. The payment network database 114 serves at least to store data in regards to card-not-present transactions processed by the payment network server 108. The payment network database 114 may also store information associated with payment cards used in these card-not-present transactions. Communication between the servers and databases may take place via any type of network, for example, a virtual private network (VPN), the Internet, a local area and/or wide area network (LAN and/or WAN), and so on.

Typically, when a consumer makes a card-not-present transaction, the consumer accesses an e-commerce platform of a merchant via a consumer device 102. The consumer device 102 may be a mobile phone, a personal computer, a tablet, a laptop, a key-fob or a personal digital assistant (PDA). The e-commerce platform may be hosted by a merchant server 104 where a product desired by the consumer may be selected for purchase. Note that the term "product" is used in this document to include any of physical objects, data products (such as, music or software) or services, which may be purchased via the e-commerce platform. To begin a purchase order, the desired products can be added to a purchase basket of the e-commerce platform. Once all the desired products are included in the purchase basket, the consumer may initiate a purchase request. Usually, if the consumer has not signed in to his/her e-commerce account hosted by the e-commerce platform earlier, the consumer is prompted at this point to sign in to an e-commerce account. Alternatively, if the consumer does not have an existing e-commerce account with the e-commerce platform, the consumer may be prompted to register an e-commerce account at this point. Some e-commerce platforms may also allow consumers to initiate a purchase order without signing in to an existing account of the e-commerce platform. The purchase order, in this case, is considered a card-not-present transaction.

Once the consumer has confirmed the desired products in the purchase basket, he/she is prompted to select a mode of payment to complete the purchase order (or the card-not-present transaction). If the consumer chooses to use a payment card, he/she will be prompted to enter payment card details and a delivery address for the card-not-present transaction. The payment card details typically comprise an indication of a payment card number, an expiry date and a card verification code (CVC2) associated with a payment card for the card-not-present transaction. The payment card details may also comprise a payment card type. The delivery address is an address where the purchased products are to be delivered to.

Alternatively, the consumer may choose to complete the purchase order using an electronic wallet via the consumer device 102. The electronic wallet may be associated with an issuer institution or an electronic wallet service provider (not shown in FIG. 1). The consumer device 102 may be installed with an application ("App"), the application being configured to be used for payment transactions with a plurality of electronic wallets. In an embodiment, the consumer is provided with an option to select one of the plurality of electronic wallets for the card-not-present transaction on the App once the consumer has confirmed the purchase order. After the consumer has chosen the electronic wallet for the purchase, he/she may be prompted to enter a delivery address for the card-not-present transaction. The App may then communicate with the merchant server 104 for processing the card-not-present transaction.

The merchant server 104, which is configured to process card-not-present transactions, then receives details of the card-not-present transactions from the consumer device 102. The details received by the merchant server 104 may be in the form of an order indication, where the order indication comprises an indication of a payment card number, a transaction amount and a delivery address associated with the card-not-present transaction. In an embodiment, an expiry date and a CVC2 associated with the payment card and a payment card type are also comprised in the order indication. The indication of the payment card number may comprise a portion of the payment card number or the full payment card number. The merchant server 104 is then configured to generate a transaction request comprising the order indication and transmit the transaction request for the card-not-present payment transaction to the acquirer server 106. The transaction request may also comprise the transaction amount for the card-not-present transaction.

In an embodiment, the acquirer server 106 is configured to receive the transaction request from the merchant server 104. The acquirer server 106 then generates a transaction authorization request for the card-not-present transaction to seek an approval for the card-not-present transaction. In this sense, the acquirer server 106 functions as a transaction processing server at which a transaction authorization request is transmitted to the relevant institutions for transaction authorization. The transaction authorization request comprises at least the indication of the payment card number and the delivery address. In an embodiment, the transaction authorization request also comprises the transaction amount associated with the card-not-present transaction. The expiry date and the CVC2 associated with the payment card may also be comprised in the transaction authorization request.

In an embodiment, the transaction authorization request is generated by the merchant server 104. The acquirer server 106 then routes the transaction authorization request from the merchant server 104 to the payment network server 108. In this case, the merchant server 104 functions as the transaction processing server where the transaction authorization request is generated.

In any of the above embodiments, whether the merchant server 104 or the acquirer server 106 is acting as the transaction processing server, the transaction authorization request is then routed by the payment network server 108 to an issuer server 110 associated with an appropriate issuer institution based on information contained in the transaction authorization request. To achieve this, the payment network server 108 is configured to determine an issuer institution associated with the indication of the payment card number used for the card-not-present transaction. In an embodiment where an electronic wallet is used for the card-not-present transaction, the payment network server 108 is configured to identify the issuer institution or the electronic wallet service provider associated with the electronic wallet. This may be done through the use of a database 114 which is operationally connected to the payment network server 108. The database 114 is configured to associate issuer institutions with a plurality of payment card numbers and/or wallet identifiers, where information stored in the database 114 aids the payment network server 108 in identifying an issuer institution for the indication of the payment card number. In the present disclosure, a payment card number may be the actual primary account number (PAN) associated with a payment device (such as a card) and optionally appearing on the face of the payment device, or may be a token representative of the actual PAN. It will be appreciated that in many instances, when payment device data is stored in a digital wallet, it is the token (which is typically device and/or context specific) and not the actual PAN which is stored on the device executing the digital wallet application (or on a secure remote server with which the device may communicate). It will also be appreciated that when a token is used as part of a payment transaction, the token is to be mapped back to the actual PAN by a tokenization service, such as Mastercard® Digital Enablement Service (MDES). The database 114 may similarly be configured to associate issuer institutions or electronic wallet service providers with a plurality of electronic wallets, where information stored in the database 114 aids the payment network server 108 in identifying an issuer institution or an electronic wallet service provider for the electronic wallet. The information stored in the database 114 may be received when the issuer institution or the electronic wallet service provider registers with the payment network server 108.

The issuer server 110 is configured to receive, from the payment network server 108, the transaction authorization request. Conventionally, the issuer server 110 then validates the payment card details associated with the card-not-present transaction to confirm that correct details associated with the indication of the payment card number have been used. This may include the issuer server 110 validating the CVC2 and the expiry date of the payment card with information stored at the issuer database 112. The issuer server 110 may also identify a consumer account associated with the indication of the payment card number to check if the consumer account has sufficient balance or available credit for the card-not-present transaction. Based on this, the transaction can be approved or declined, and a transaction authorization response is transmitted from the issuer server 110 to the payment network server 108, which then routes the transaction authorization response to the acquirer server 106. The acquirer server 106, in turn, sends the transaction authorization response to the merchant server 104. If the transaction authorization response indicates that the card-not-present transaction is approved, then the account of the merchant is credited by the amount of the card-not-present transaction following subsequent clearing and settlement processes, and the consumer account is debited accordingly.

In addition to the validation steps described above, the issuer server 110 of the present embodiment is configured to retrieve a registered address associated with the indication of the payment card number and compare it with the delivery address comprised in the transaction request to verify if the delivery address matches the registered address. The present embodiment thus provides an additional authentication step to verify the use of the indication of the payment card number for the card-not-present transaction, thereby providing added security for the transaction. In this case, the issuer server 110 will generate the transaction authorization response based on the result of the comparison. The transaction authorization response, comprising an indication that the card-not-present transaction is to proceed, is generated only if it is also determined by the issuer server 110 that the delivery address matches the registered address. In other words, the comparison of the delivery address of the card-not-present transaction with the registered address works in addition to the present available validation steps. Nonetheless, it will be understood by the person skilled in the art that the comparison step may also be used to replace an existing validation step or to use in any combination with existing validation steps as will be necessary. Moreover, the comparison step to verify if the delivery address matches the registered address may include comparing if certain identifiers are comprised in the address. For example, the identifiers can be a street name, a road name, or a country name. The identifiers may also comprise a string of symbols and/or numerals, such as a unit number or a postal code. In this way, the delivery address may match the registered address even if the delivery address is not identical to the registered address. In an embodiment, the issuer server 110 is configured to retrieve the registered address from the issuer database 112. Alternatively, the issuer server 110 may be configured to retrieve the registered address from the payment network database 114 by communicating a request for the registered address through the payment network server 108.

In an embodiment, where it is determined by the issuer server 110 that the delivery address does not match the registered address associated with the indication of the payment card number, the issuer server 110 is configured to send a verification request to the consumer device 102. In determining what to send in the verification request, the issuer server 110 may take into account factors, such as a transaction amount and/or a transaction frequency of the card-not-present transaction, as described below.

In an embodiment, the issuer server 110 determines if the transaction amount comprised in the transaction authorization request is greater than or equal to a transaction threshold, where the transaction threshold is associated with the indication of the payment card number and is stored in an issuer database 112 in communication with the issuer server 110. In an embodiment, the transaction threshold is stored in the payment network database 114 in communication with the payment network server 108. The transaction threshold defines a value of a transaction above which the transaction is considered high-value and demands a stronger security protocol. For example, the transaction threshold may be an absolute value, such as $500 or $1000, or a percentage of the user's monthly income (in cases where this information is available). It will be appreciated that the transaction threshold may depend on the context in which the transaction takes place. For example, in a low-income country, the transaction threshold will typically be much lower than in a high-income country. The transaction threshold may also be determined according to, for example, local tax regulations or payment industry regulations in the country in which the transaction takes place, as such regulations may define a threshold for a transaction to be "high value". In an embodiment, the transaction threshold is determined by the issuer institution associated with the issuer server 110. Alternatively, the transaction threshold may be chosen by the consumer and registered at the issuer database 112 via the consumer device 102. If it is determined that the transaction amount is greater than or equal to the transaction threshold, the issuer server 110 may be configured to include at least another personal identifier or a more complex personal identifier in the verification request. In an embodiment, a more complex personal identifier is a personal identifier which is longer in length and/or is harder to guess as it is less related to the consumer. An example of a more complex personal identifier is a PIN which includes symbols and numerals that have no direct association with the consumer.

In an embodiment, the issuer server 110 calculates a transaction frequency in which the indication of the payment card number is used for card-not-present transactions, where the transaction frequency may be defined as a number of card-not-present transactions processed using the indication of the payment card number within a predetermined period of time. The predetermined period of time may be defined by the issuer server 110. Alternatively, the predetermined period of time may be chosen by the skilled person in the art taking into consideration a shopping habit of individual consumers. In an embodiment, the predetermined period of time is a period of one day, one week, two weeks, one month, two months, six months or a year. Once the transaction frequency is calculated, the issuer server 110 is configured to determine if the transaction frequency is greater than or equal to a transaction frequency threshold. The transaction frequency threshold is associated with the indication of the payment card number and may be defined by the issuer institution associated with the issuer server 110. Alternatively, the transaction frequency threshold may be chosen by the consumer and registered at the issuer server 110 via the consumer device 102. The transaction frequency threshold may be determined according to, for example, the average number of card-not-present transactions carried out by the user in the predetermined period of time. If the issuer server 110 determines that the transaction frequency is greater than or equal to the transaction frequency threshold, the issuer server 110 may be configured to include at least another personal identifier or a more complex personal identifier in the verification request. In an embodiment, a more complex personal identifier is a personal identifier which is longer in length and/or is harder to guess as it is less related to the consumer. An example of a more complex personal identifier is a PIN which includes symbols and numerals that have no direct association with the consumer.

After taking into account the different aspects as described above, singularly or in combination, the verification request is generated by the issuer server 110. The verification request comprises a request for at least one personal identifier, the at least one personal identifier being associated with the indication of the payment card number. The personal identifier may be selected from one of the following: a personal identification number (PIN), a one-time password (OTP), a gesture, a name of a childhood friend, a wedding anniversary date or a biometric identifier. After receiving the verification request, the consumer is prompted, via the consumer device 102, to respond to the verification request. The response from the consumer may then be sent from the consumer device 102 to the issuer server 110 as a verification response, where the verification response comprises at least one personal identifier input in response to the at least one personal identifier requested in the verification request. The verification request and the verification response can be communicated to and from the consumer device 102 as provided by the communication architecture, as shown in FIG. 1. For example, the issuer server 110 can communicate the verification request to the consumer device 102 directly, while receiving the verification response from the consumer device 102 via the merchant server 104, the acquirer server 106 and the payment network server 108. In another example, the verification response is received by the issuer server 110 directly from the consumer device 102.

After receiving the verification response from the consumer, the issuer server 110 compares if the at least one personal identifier input matches the at least one personal identifier. The issuer server 110 then generates a second-factor transaction authorization response comprising an indication that the card-not-present transaction is to proceed if it is determined that the at least one personal identifier input matches the at least one personal identifier. If it is determined that the at least one personal identifier input does not match the at least one personal identifier, the card-not-present transaction is refused. In this case, the consumer may be prompted to provide another mode of payment for the card-not-present transaction.

In an embodiment, the additional authorization steps (i.e., the steps described in paragraphs [0036] to [0041] above), which involve comparing the registered address associated with the indication of the payment card number with the delivery address comprised in the transaction request, are carried out by the payment network server 108 instead of the issuer server 110. This may also include the steps of generating a verification request and sending the verification request to the consumer device 102 if it is determined by the payment network server 108 that the delivery address does not match with the registered address associated with the indication of the payment card number. The verification request and the verification response can be communicated to and from the consumer device 102 as provided by the communication architecture, as shown in FIG. 1. For example, the payment network server 108 can communicate the verification request to the consumer device 102 directly, while receiving the verification response from the consumer device 102 via the merchant server 104 and the acquirer server 106. Alternatively, the verification response may be received by the payment network server 108 directly from the consumer device 102. Moreover, the payment network server 108 may also include at least another personal identifier or a more complex personal identifier in the verification request if it is determined by the payment network server 108 that the transaction amount is greater than or equal to the transaction threshold or that the transaction frequency is greater than or equal to the transaction frequency threshold. In an embodiment, the transaction threshold or the transaction frequency threshold are defined by the payment network server 108. It will be understood by the skilled person in the art that the additional authorization steps may be carried out by the payment network server 108 and/or the issuer server 110 in a mix and match manner as would be necessary for the card-not-present transaction to be carried out in an efficient manner as deemed fit by the skilled person in the art.

It is noted that the registered address and the at least one personal identifier associated with the indication of the payment card number may be stored either at the issuer database 112 or at the payment network database 114 or at both databases 112, 114. The issuer database 112 is configured to be in communication with the issuer server 110, and may also be configured to be in communication with the payment network server 108 via the issuer server 110 for the purposes of the additional authorization steps as described above. Similarly, the payment network database 114 is configured to be in communication with the issuer server 110, and may also be configured to be in communication with the payment network server 108 via the issuer server 110 for the purposes of the additional authorization steps as described above.

Based on the results from the additional authorization steps and/or the results from the conventional validation steps as described in paragraph [0035], the issuer server 110 or the payment network server 108 can then generate the transaction authorization response. The transaction authorization response may comprise an approval to proceed with the card-not-present transaction if the necessary conventional validation steps and/or the additional authorization steps are successful. The determination as to which are the necessary conventional validation steps and/or the additional authorization steps may be carried out by the skilled person in the art so as to create an efficient and secure method for processing card-not-present transactions. In an embodiment, the card-not-present transaction is to proceed only if the conventional validation steps and the additional authorization steps are authenticated successfully.

As will be understood by a skilled person, each of the various apparatuses in the computerized network 100 has a communication module, such as a wireless interface, for two-way communication between one and another via a communication network. The communication network could be any types of network, for example, virtual private network (VPN), the Internet, a local area and/or wide area network (LAN and/or WAN), and so on.

Figure 2:
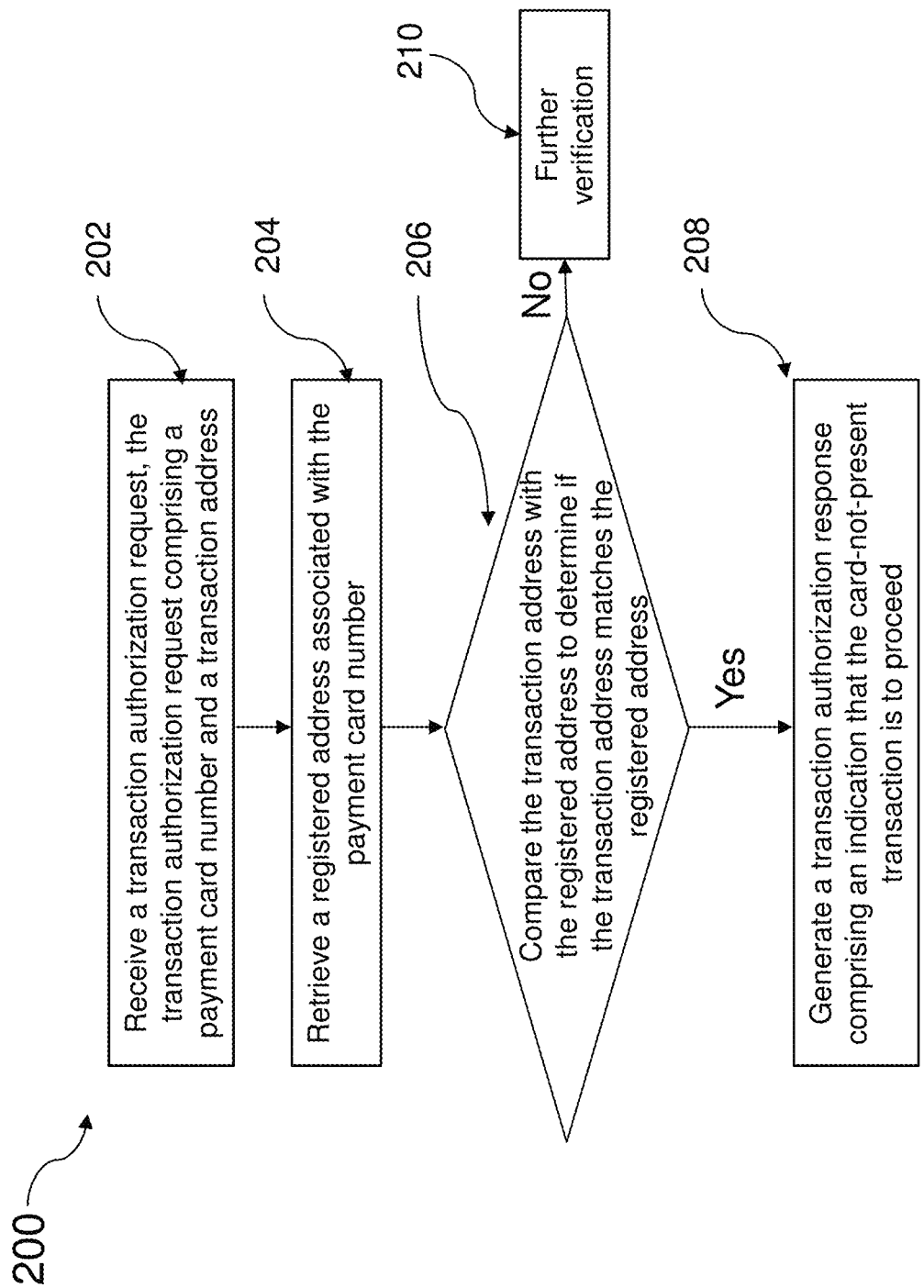
FIG. 2 shows the steps of a method which is an embodiment of the disclosure and which may be performed by a server comprised in the computerized network of FIG. 1.

A method 200 carried out by a server of the computerized network 100 is illustrated in FIG. 2. The server may be a payment network server 108 or an issuer server 110 comprised in the computerized network 100.

Referring to FIG. 2, in a step 202, the server 108, 110 receives a transaction authorization request comprising an indication of a payment card number and a delivery address. The indication of the payment card number may comprise a portion of the payment card number or the full payment card number. The transaction authorization request may be generated by the merchant server 104 or the acquirer server 106. The transaction authorization request may then be received by the payment network server 108 or by the issuer server 110 via the payment network server 108.

In a step 204, the server 108, 110 retrieves a registered address associated with the indication of the payment card number. In an embodiment, the step 204 further comprises querying a database to ascertain the registered address associated with the indication of the payment card number, where the database is operationally connected to the server 108, 110. The database may be the issuer database 112 or the payment network database 114.

The server 108, 110 may then compare the delivery address with the registered address at a step 206 to determine if the delivery address matches the registered address.

In a step 208, the server 108, 110 generates a transaction authorization response based on a result of the comparison, the transaction authorization response comprising an indication that the card-not-payment transaction is to proceed if the delivery address matches the registered address. In an embodiment, the comparison of the delivery address of the card-not-present transaction with the registered address works in addition to the present available validation steps. In this case, the transaction authorization response may be generated only if the authentication steps described in FIG. 2 and the conventional validation steps (e.g., validation of the expiry date and the CVC2 or CVV2 associated with the payment card for the card-not-present transaction) are successful.

In an event that the delivery address does not match the registered address, the server 108, 110 is configured to carry out, in a step 210, further verification steps. An example of further verification steps is illustrated in FIG. 3.

Figure 3:
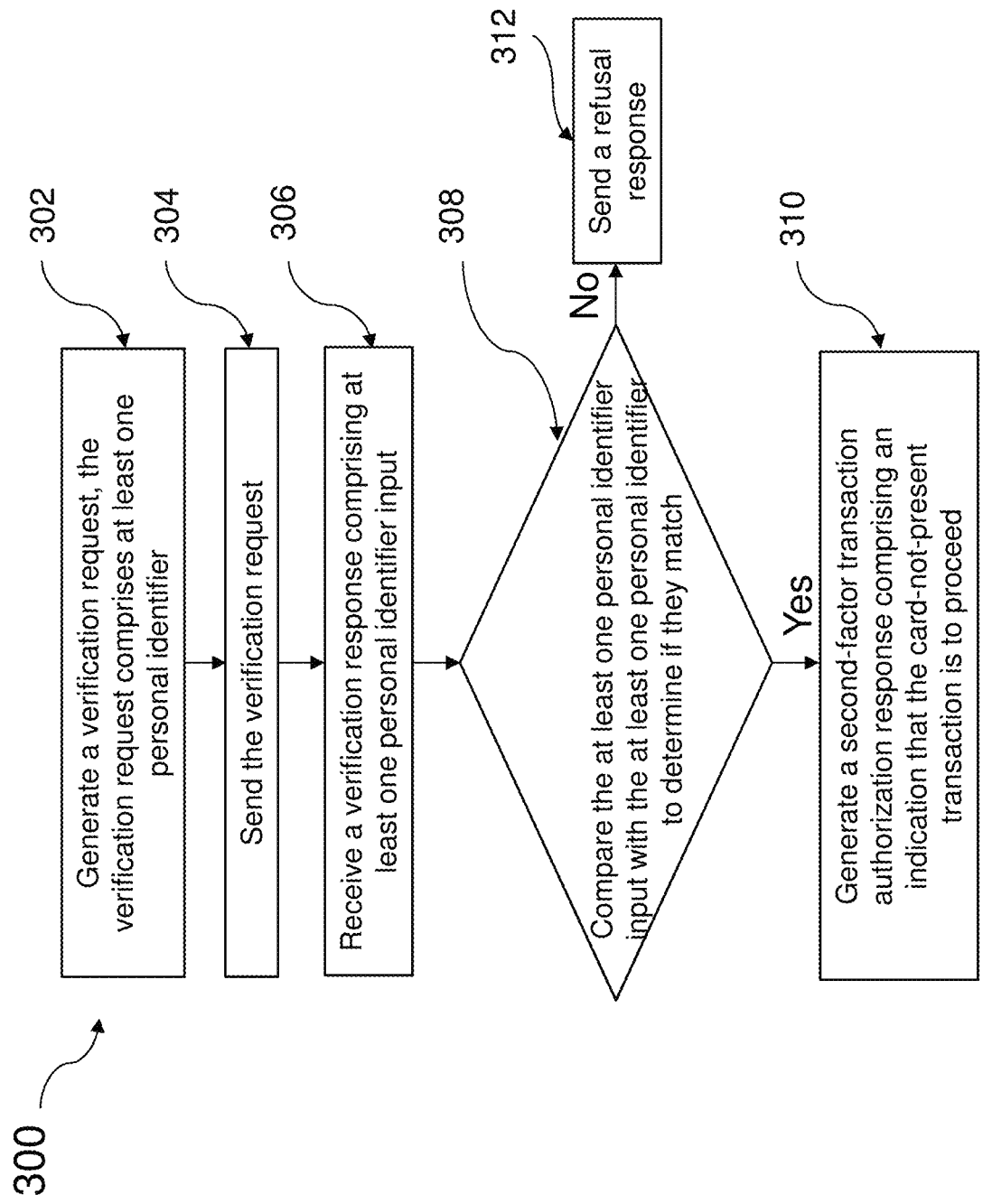
FIG. 3 shows additional steps to the method of FIG. 2 which may be performed by the server of FIG. 1 in accordance with an embodiment of the disclosure.

FIG. 3 shows additional steps of a method 300 which may be performed by the server 108, 110 of FIG. 1 in accordance with an embodiment of the disclosure. The method 300 may be carried out by the payment network server 108 or the issuer server 110 comprised in the computerized network 100.

Referring to FIG. 3, in a step 302 of the method 300, the server 108, 110 generates a verification request if the delivery address does not match the registered address. The verification request comprises a request for at least one personal identifier, where the at least one personal identifier is associated with the indication of the payment card number used in the card-not-present transaction. The at least one personal identifier may be selected from one of the following: a personal identification number (PIN), a one-time password (OTP), a gesture, a name of a childhood friend, a wedding anniversary date or a biometric identifier.

In a step 304, the verification request is sent to a consumer device 102. The verification request can be communicated to the consumer device 102 as provided by the communication architecture, as shown in FIG. 1. In an embodiment where the server is the payment network server 108, the verification request is sent to the consumer device 102 directly or via the acquirer server 106 and the merchant server 104. In an embodiment where the server is the issuer server 110, the verification request is sent to the consumer device 102 directly, or via the payment network server 108, or via the payment network server 108, the acquirer server 106 and the merchant server 104.

In a step 306, the server 108, 110 then receives a verification response comprising at least one personal identifier input from the consumer device 102. Similarly, the verification response may be received by the server 108, 110 as provided by the communication architecture in FIG. 1.

Upon receiving the verification response, the server 108, 110 compares the at least one personal identifier input with the at least one personal identifier in a step 308 to determine if the at least one personal identifier input matches the at least one personal identifier.

The server 108, 110 then generates a second-factor transaction authorization response in a step 310 based on a result of the comparison, where the second-factor transaction authorization response comprises an indication that the card-not-present transaction is to proceed if the at least one personal identifier input matches the at least one personal identifier. In an embodiment, second-factor transaction authorization response works in addition to the present available verification steps as described with FIG. 1. In other words, the card-not-present transaction is to proceed only if the verification steps described in FIG. 3 and the conventional validation steps (e.g., validation of the expiry date and the CVC2 or CVV2 associated with the payment card for the card-not-present transaction) are successful.

In an event that the at least one personal identifier input does not match the at least one personal identifier, the server 108, 110 may refuse to proceed with the card-not-present transaction in a step 312. In an embodiment, the consumer is then prompted to use another mode of payment for the card-not-present transaction.

FIG. 4 shows additional steps which may be performed by the server 108, 110 of FIG. 1 in accordance with an embodiment of the disclosure. The method 400 may be carried out by the server 108, 110 as further steps within the step 302 of method 300 in FIG. 3 to further enhance the security of card-not-present transactions.

In a step 402, the server 108, 110 determines if the transaction amount associated with the card-not-present transaction is greater than or equal to a transaction threshold, where the transaction threshold is associated with the indication of the payment card number used in the card-not-present transaction. The transaction threshold may be defined by the server 108, 110 and is registered at a database 112, 114 associated with the server 108, 110. The database 112, 114 may be the issuer database 112 or the payment network database 114. In an embodiment, the consumer communicates with the server 108, 110 to set the transaction threshold via the consumer device 102.

In a step 404, the server 108, 110 includes at least another personal identifier or a more complex personal identifier in the verification request if it is determined that the transaction amount is greater than or equal to the transaction threshold. The another personal identifier may be selected from one of the following: a personal identification number (PIN), a one-time password (OTP), a gesture, a name of a childhood friend, a wedding anniversary date or a biometric identifier. In an embodiment, the personal identifiers comprised in the verification request are of different types. In an embodiment, a more complex personal identifier is a personal identifier which is longer in length and/or is harder to guess as it is less related to the consumer. An example of a more complex personal identifier is a PIN which includes symbols and numerals that have no direct association with the consumer.

In a step 406, the verification request does not include at least another personal identifier or a more complex personal identifier if it is determined that the transaction amount is less than the transaction threshold. In this case, it is deemed that the verification request with at least one personal identifier as described in the step 302 is sufficient for the card-not-present transaction in question.

FIG. 5 shows additional steps which may be performed by the server 108, 110 of FIG. 1 in accordance with an embodiment of the disclosure. The method 500 may be carried out by the server 108, 110 as further steps within the step 302 of method 300 in FIG. 3 and may work in combination with the method 400 in FIG. 4 to further improve the security of card-not-present transactions.

In a step 502, the server 108, 110 calculates a transaction frequency in which the indication of the payment card number is used for card-not-present transactions, the transaction frequency being a number of card-not-present transactions processed using the indication of the payment card number within a predetermined period of time.

Using the result from the step 502, the server 108, 110 determines in a step 504 if the transaction frequency is greater than or equal to a transaction frequency threshold, where the transaction frequency threshold is associated with the indication of the payment card number used in the card-not-present transaction. The transaction frequency threshold may be defined by the server 108, 110 and is registered at the database 112, 114 associated with the server 108, 110. In an embodiment, the consumer communicates with the server 108, 110 to set the transaction frequency threshold via the consumer device 102.

In a step 506, the server 108, 110 include at least another personal identifier or a more complex personal identifier in the verification request if it is determined that the transaction frequency is greater than or equal to the transaction frequency threshold. The another personal identifier may be selected from one of the following: a personal identification number (PIN), a one-time password (OTP), a gesture, a name of a childhood friend, a wedding anniversary date or a biometric identifier. In an embodiment, the personal identifiers comprised in the verification request are of different types. In an embodiment, a more complex personal identifier is a personal identifier which is longer in length and/or is hard to guess as it is less related to the consumer. An example of a more complex personal identifier is a PIN which includes symbols and numerals that have no direct association with the consumer.

In a step 508, the verification request does not include at least another personal identifier or a more complex personal identifier if it is determined that the transaction frequency is less than the transaction frequency threshold. In this case, it is deemed that the verification request as described in the step 302 is sufficient for the card-not-present transaction in question.

It is noted that the method 400 in FIG. 4 and the method 500 in FIG. 5 may be carried out in parallel and the results of which may be used in combination to determine if at least another personal identifier or a more complex personal identifier is to be included when the verification request is generated at the step 302.

Figure 6:
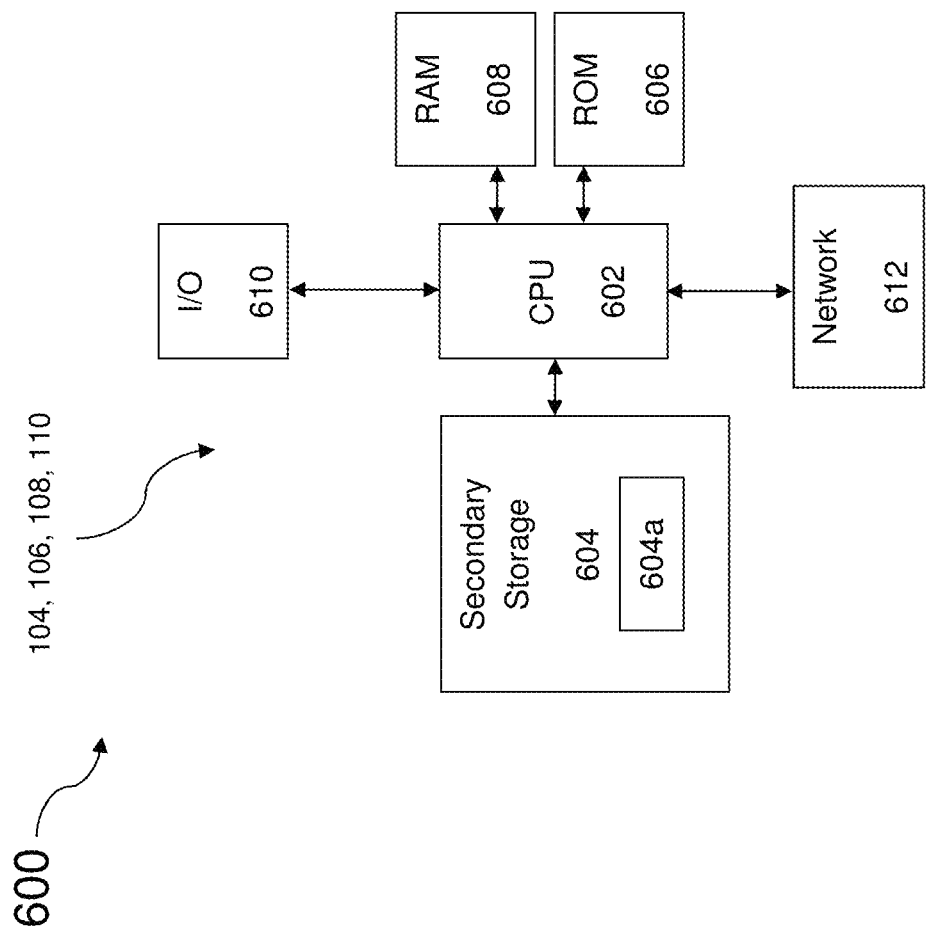
FIG. 6 shows schematically the structure of a server which may be used in the computerized network of FIG. 1 to implement a method which is an embodiment of the disclosure.

FIG. 6 is a block diagram showing a technical architecture 600 of the issuer server 110 and/or the acquirer server 106. The merchant server 104 and/or the payment network server 108 may also have this technical architecture.

The technical architecture 600 includes a processor 602 (which may be referred to as a central processor unit or CPU) that is in communication with memory devices including secondary storage 604 (such as disk drives), read only memory (ROM) 606, random access memory (RAM) 608. The processor 602 may be implemented as one or more CPU chips. The technical architecture 600 may further comprise input/output (I/O) devices 610, and network connectivity devices 612.

The secondary storage 604 is typically comprised of one or more disk drives or tape drives and is used for non-volatile storage of data and as an over-flow data storage device if RAM 608 is not large enough to hold all working data. Secondary storage 604 may be used to store programs which are loaded into RAM 608 when such programs are selected for execution.

In this embodiment, the secondary storage 604 has a processing component 604a comprising non-transitory instructions operative by the processor 602 to perform various operations of the method of the present disclosure. The ROM 606 is used to store instructions and perhaps data which are read during program execution. The secondary storage 604, the RAM 608, and/or the ROM 606 may be referred to in some contexts as computer readable storage media and/or non-transitory computer readable media.

I/O devices 610 may include printers, video monitors, liquid crystal displays (LCDs), plasma displays, touch screen displays, keyboards, keypads, switches, dials, mice, track balls, voice recognizers, card readers, paper tape readers, or other well-known input devices.

The network connectivity devices 612 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols, such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 612 may enable the processor 602 to communicate with the Internet or one or more intranets. With such a network connection, it is contemplated that the processor 602 might receive information from the network, or might output information to the network in the course of performing the above-described method operations. Such information, which is often represented as a sequence of instructions to be executed using processor 602, may be received from and outputted to the network, for example, in the form of a computer data signal embodied in a carrier wave.

The processor 602 executes instructions, codes, computer programs, scripts which it accesses from hard disk, floppy disk, optical disk (these various disk based systems may all be considered secondary storage 604), flash drive, ROM 606, RAM 608, or the network connectivity devices 612. While only one processor 602 is shown, multiple processors may be present. Thus, while instructions may be discussed as executed by a processor, the instructions may be executed simultaneously, serially, or otherwise executed by one or multiple processors.

Although the technical architecture is described with reference to a computer, it should be appreciated that the technical architecture may be formed by two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the technical architecture 600 to provide the functionality of a number of servers that is not directly bound to the number of computers in the technical architecture 600. In an embodiment, the functionality disclosed above may be provided by executing the application and/or applications in a cloud computing environment. Cloud computing may comprise providing computing services via a network connection using dynamically scalable computing resources. A cloud computing environment may be established by an enterprise and/or may be hired on an as-needed basis from a third party provider.

It is understood that by programming and/or loading executable instructions onto the technical architecture, at least one of the CPU 602, the RAM 608, and the ROM 606 are changed, transforming the technical architecture in part into a specific purpose machine or apparatus having the novel functionality taught by the present disclosure. It is fundamental to the electrical engineering and software engineering arts that functionality that can be implemented by loading executable software into a computer can be converted to a hardware implementation by well-known design rules.

Whilst the foregoing description has described exemplary embodiments, it will be understood by those skilled in the art that many variations of the embodiments can be made within the scope of the present disclosure as defined by the claims. Moreover, features of one or more embodiments may be mixed and matched with features of one or more other embodiments.

With that said, and as described, it should be appreciated that one or more aspects of the present disclosure transform a general-purpose computing device into a special-purpose computing device (or computer) when configured to perform the functions, methods, and/or processes described herein. In connection therewith, in various embodiments, computer-executable instructions (or code) may be stored in memory of such computing device for execution by a processor to cause the processor to perform one or more of the functions, methods, and/or processes described herein, such that the memory is a physical, tangible, and non-transitory computer readable storage media. Such instructions often improve the efficiencies and/or performance of the processor that is performing one or more of the various operations herein. It should be appreciated that the memory may include a variety of different memories, each implemented in one or more of the operations or processes described herein. What's more, a computing device as used herein may include a single computing device or multiple computing devices.

In addition, the terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

It is also noted that none of the elements recited in the claims herein are intended to be a means-plus-function element within the meaning of 35 U.S.C. § 112(f) unless an element is expressly recited using the phrase "means for," or in the case of a method claim using the phrases "operation for" or "step for."

Again, the foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An issuer server of an issuer for processing a card-not-present (CNP) transaction, the issuer server comprising:
    a computer processor and a data storage device, the data storage device including executable instructions which, when executed by the computer processor, cause the issuer server to:
        receive, from an acquirer associated with a merchant, via a payment network associated with a payment card issued to a consumer by the issuer, an authorization request for a card-not-present (CNP) transaction for one or more products, the authorization request including a credential for the payment card and a delivery address for the one or more products;
        based on the credential, retrieve, from a database in communication with the issuer server, an address registered in association with the credential, the database including a plurality of addresses registered for a plurality of payment card credentials;
        compare the delivery address with the registered address; and
        in response to the delivery address not matching the registered address:
            generate a verification request for at least one personal identifier associated with the credential for the payment card;
            send the verification request to a communication device associated with the consumer, to thereby solicit the at least one personal identifier from the consumer;
            receive, from the communication device, a verification response including at least one personal identifier input;
            in response to the at least one personal identifier input matching the at least one personal identifier, generate a second-factor authorization response including an indication that the CNP transaction is to proceed; and
            in response to the at least one personal identifier input not matching the at least one personal identifier, decline the CNP transaction.

2. The issuer server of claim 1, wherein the executable instructions, when executed by the computer processor, further cause the issuer server to compare the at least one personal identifier input with the at least one personal identifier.

3. The issuer server of claim 1, wherein the authorization request further includes an amount for the CNP transaction; and wherein the executable instructions, when executed by the computer processor, further cause the issuer server to:
determine whether the amount is greater than or equal to a transaction threshold, the transaction threshold associated with the credential for the payment card; and
in response to the amount being greater than or equal to the transaction threshold, include at least another personal identifier or a more complex personal identifier in the verification request.

4. The issuer server of claim 1, wherein the executable instructions, when executed by the computer processor, further cause the issuer server to:
calculate a transaction frequency with which the credential for the payment card is used for CNP transactions;
determine whether the transaction frequency is greater than or equal to a transaction frequency threshold, the transaction frequency threshold being associated with the credential for the payment card; and
in response to the transaction frequency being greater than or equal to the transaction frequency threshold, include at least another personal identifier or a more complex personal identifier in the verification request.

5. The issuer server of claim 1, wherein the at least one personal identifier includes at least one of: a personal identification number (PIN), a one-time password (OTP), a gesture, a name of a childhood friend, a wedding anniversary date and/or a biometric identifier.

6. A computer-implemented method for processing a card-not-present (CNP) transaction, the method comprising:
receiving, by an issuer server, from an acquirer associated with a merchant, via a payment network associated with a payment card, an authorization request for a CNP transaction involving the payment card, the authorization request including a credential for the payment card and a delivery address;
based on the credential, retrieving, by the issuer server, from a database in communication with the issuer server, a registered address associated with the credential for;
comparing, by the issuer server, the delivery address with the registered address; and
in response to the delivery address not matching the registered address:
generating, by the issuer server, a verification request for at least one personal identifier associated with the credential for the payment card;
sending, by the issuer server, the verification request;
receiving, by the issuer server, a verification response including at least one personal identifier input;
comparing, by the issuer server, the at least one personal identifier input with the at least one personal identifier; and
in response to the at least one personal identifier input matching the at least one personal identifier, generating, by the issuer server, a second-factor authorization response, the second-factor authorization response including an indication that the CNP transaction is to proceed despite the delivery address not matching the registered address.

7. The method of claim 6, wherein the authorization request further includes a transaction amount associated with the CNP transaction; and
wherein generating the verification request further includes:
determining, by the issuer server, whether the transaction amount is greater than or equal to a transaction threshold, the transaction threshold being associated with the credential for the payment card; and
in response to the transaction amount being greater than or equal to the transaction threshold, including, by the issuer server, a request for at least another personal identifier or a more complex personal identifier in the verification request.

8. The method of claim 7, wherein generating the verification request further includes:
calculating, by the issuer server, a transaction frequency with which the credential for the payment card is used for CNP transactions;
determining, by the issuer server, whether the transaction frequency is greater than or equal to a transaction frequency threshold, the transaction frequency threshold being associated with the credential for the payment card; and
in response to the transaction frequency being greater than or equal to the transaction frequency threshold, including, by the issuer server, a request for at least another personal identifier or a more complex personal identifier in the verification request.

9. The method of claim 6, wherein retrieving the registered address associated with the indication of the payment card number includes querying a database to ascertain the registered address associated with the credential for the payment card, the database being operationally connected to the issuer server.

10. A non-transitory computer-readable storage medium including executable instructions, which, when executed by at least one processor of an issuer, cause the at least one processor of the issuer to:
receive, from an acquirer associated with a merchant, via a payment network associated with a payment card, an authorization request for a card-not-present (CNP) transaction involving the payment card, the authorization request including a credential for the payment card and a delivery address;
based on the credential for the payment card, retrieve a registered address associated with the credential;
compare the delivery address with the registered address; and
in response to the delivery address not matching the registered address:
generate a verification request for at least one personal identifier associated with the credential for the payment card;
send the verification request to a communication device;
receive, from the communication device, a verification response including at least one personal identifier input;
in response to the at least one personal identifier input matching the at least one personal identifier, generate a second-factor authorization response including an indication that the CNP transaction is to proceed; and
in response to the at least one personal identifier input not matching the at least one personal identifier, decline the CNP transaction.

11. The non-transitory computer-readable storage medium of claim 10, wherein the executable instructions, when executed by the at least one processor, further cause the at least one processor to compare the at least one personal identifier input with the at least one personal identifier.

12. The issuer of claim 1, wherein the executable instructions, when executed by the computer processor, further cause the computer processor to, in response to the delivery address matching the registered address, generate an authorization response including an indication that the CNP transaction is to proceed.

13. The method of claim 6, further comprising, in response to the delivery address matching the registered address, generating, by the issuer server, an authorization response including an indication that the CNP transaction is to proceed.

14. The non-transitory computer-readable storage medium of claim 10, wherein the executable instructions, when executed by the at least one processor, further cause the at least one processor to, in response to the delivery address matching the registered address, generate an authorization response including an indication that the CNP transaction is to proceed.

* * * * *